United States Patent Office 3,532,767
Patented Oct. 6, 1970

3,532,767
HEAT-HARDENABLE BINDERS FOR
COATING COMPOSITIONS
Horst Dalibor and Hans-Joachim Kiessling, Hamburg,
Germany, assignors to Reichhold Chemicals, Inc.,
White Plains, N.Y.
No Drawing. Filed Mar. 10, 1967, Ser. No. 622,041
Claims priority, application Germany, Mar. 28, 1966,
R 42,948
Int. Cl. C08f 37/16; C08g 37/32
U.S. Cl. 260—854   15 Claims

ABSTRACT OF THE DISCLOSURE

The heat-hardenable binder according to the present invention contains as component (a) 50 to 95% by weight of reaction products of tri- to hexavalent alcohols, if necessary, together with mono- or dialcohols, and soluble copolymers that are obtained by copolymerization of less than 20 mole percent of $\alpha,\beta$-unsaturated dicarboxylic acid anhydride, difficultly saponifiable vinyl esters having the general formula:

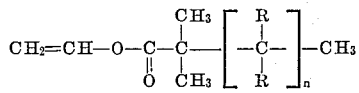

wherein R=H, —CH$_3$, —C$_2$H$_5$, —C$_3$H$_7$, C$_4$H$_9$ or —C$_6$H$_5$ radicals and n=0, 1, 2, 3 to 6, and acrylic acid ester and/or fumaric acid ester, if necessary together with methacrylic acid esters and $\alpha$-olefines, that have acid numbers from 5 to 60, preferably 20 to 50, and hydroxyl numbers from 20 to 120, preferably 30 to 90 and as components (b) 5 to 50% by weight of urea or aminotriazine resins that are obtained by condensation of formaldehyde with urea or aminotriazine followed by alkylation with alcohols containing 1 to 6 carbon atoms.

RELATED APPLICATIONS

The present application is related to the following: (1) U.S. application Ser. No. 622,080, filed Mar. 10, 1967, corresponding to German application R 42,944, filed Mar. 28, 1966 (2043); (2) U.S. application Ser. No. 622,039, filed Mar. 10, 1967, corresponding to German application R 42,945, filed Mar. 28, 1966 (2054); (3) U.S. application Ser. No. 622,112, filed Mar. 10, 1967, corresponding to German application R 42,946, filed Mar. 28, 1966 (2055), and (4) U.S. application Ser. No. 622,090, filed Mar. 10, 1967, corresponding to German application R 42,947, filed Mar. 28, 1966 (2056).

The heat-hardenable binder according to the present invention contains as component (a) 50 to 95% by weight of reaction products of alcohols having at least 3 hydroxy groups present, preferably tri- to hexavalent alcohols, if necessary to which may be added if desired mono- or dialcohols, and soluble copolymers that are obtained by copolymerization of from 1–25% and preferably less than 20 mole percent of alpha-beta unsaturated dicarboxylic acid anhydride, and the remainder (99–75%) vinyl esters having the general formula:

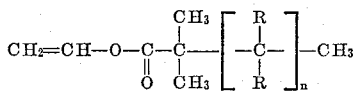

wherein R=H, —CH$_3$, —C$_2$H$_5$, —C$_3$H$_7$, C$_4$H$_9$ or —C$_6$H$_5$ radicals and n=0, 1, 2, 3 to 6, and acrylic acid ester and/or fumaric acid ester, if necessary together with methacrylic acid esters and alpha-olefines, that have acid numbers from 5 to 60, preferably 20 to 50, and hydroxyl numbers from 20 to 120, preferably 30 to 90 and as component (b) 5 to 50% by weight of urea or aminotriazine resins that are obtained by condensation of formaldehyde with urea or aminotriazine followed by alkylation with alcohols preferably containing 1 to 6 carbon atoms.

Heat-hardenable binders for coating compositions consisting of aminotriazine resins and plasticizing components having hydroxyl and carboxyl groups are known. As the plasticizing component it was customary to use therewith condensation resins of low molecular weight or high molecular weight polymers having thermoplastic properties.

German Pat. 544,326 describes the preparation of anhydride groups-containing polymers that are reacted with mono- and polyols. However, soluble anhydride groups-containing polymers reacted with mono- or dialcohols are unimportant as binders for coating compositions, particularly for lacquer raw materials, since even combinations thereof with urea- or aminotriazine-formaldehyde resins resulted in coatings having insufficient resistance to solvents, water and bases. Soluble anhydride groups-containing copolymers of the kind reacted only with triols could not, however, be obtained by the process of German Pat. 544,326.

Copolymers, as described in the examples of the aforesaid German patent, having a content of 30 and more percent by weight of maleic acid anhydride in the copolymer, yield insoluble products upon being reacted solely with trivalent alcohols, before achieving compatibility with urea- or aminotriazine-formaldehyde resins.

It has now been found that it is possible to obtain products that are suitable for coating compositions if the copolymers reacted with polyols, used in a mixture with etherified aminotriazine-formaldehyde resins as heat-hardenable binders are copolymers containing less than 20 mole percent of $\alpha,\beta$-unsaturated dicarboxylic acid anhydride. For the reaction with the copolymers, in order to obtain the aforesaid component (a), it is possible to use as polyols tri- to hexavalent alcohols, if necessary, together with mono- and dialcohols. Moreover, it was found that products, particularly suitable for use in combination with etherified aminotriazine-formaldehyde resins as binders for coating compositions, are those wherein the copolymers are reacted with trivalent alcohols, without the use of mono- and divalent alcohols. Outstanding properties were found in the case of copolymers reacted with polyols wherein the polyols are trivalent alcohols and, more particularly, those that are less polar than glycerin, as for example, hexanetriol or trimethylalkanes.

Of these trivalent alcohols that are less polar than glycerin, the most suitable for the preparation of component (a) was found to be a reaction product obtained with trimethylolpropane, wherein for each mole of anhydride there are used in the copolymerization 0.8 to 1.8 moles, preferably 0.8 to 1.2 moles of trimethylolpropane.

In the preparation of component (a) by the partial reaction of the copolymers having a content of less than 20 mole percent, preferably of 5 to 10 mole percent of an $\alpha,\beta$-unsaturated dicarboxylic acid anhydride, with polyols of the aforesaid type, it is possible to obtain, by selecting the quantitative relation and the reaction time, soluble reaction products which, aside from an acid number of 5 to 60, preferably of 20 to 50, possess a hydroxyl number of 20 to 120, preferably of 30 to 90.

For the coating compositions according to the present invention, the content of free hydroxyl groups possessed by the component (a) in the form of modified copolymers is a prerequisite for the combination and compatibility with aminotriazine-formaldehyde resins and for the cross-linking reactions with the methylol- or methylolether groups, which are promoted by the free carboxyl groups.

The copolymers to be reacted with triols may contain, copolymerized therein instead of maleic acid anhydride other α,β-unsaturated dicarboxylic acid anhydrides, such as itaconic acid anhydride.

When itaconic acid is used in place of maleic acid anhydride, the copolymer may contain up to 25%, and preferably not more than 23% by weight, of the itaconic acid anhydride, and the use of a proportion of 6–12% by weight of itaconic acid anhydride has been found to produce most favorable results.

Where less than 5–16% by weight of the maleic or itaconic acid anhydride are used, less satisfactory results are obtained than are obtained when the preferred range is employed, and in any event a small but effective percentage of the anhydride, preferably at least 1% by weight, should be employed.

For the use as binders in coating compositions in combination with aminotriazine resins, in accordance with the present invention, the structure as well as the composition of the starting polymers is of considerable importance. In the preparation of component (a) it is possible to use for the starting copolymer, aside from less than 20 mole percent, preferably 5 to 10 mole percent, of α,β-unsaturated dicarboxylic acid anhydride, the following copolymerizable monomers: difficultly saponifiable vinyl esters having the formula:

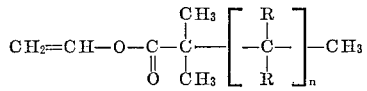

wherein R=H, —CH$_3$, —C$_2$H$_5$, —C$_3$H$_7$, —C$_4$H$_9$ or —C$_6$H$_5$ and n=0, 1, 2, 3 to 6, acrylic acid and methacrylic acid and/or fumaric acid esters that contain 1 to 10 carbon atoms in the alcohol portion thereof, and monoolefines having the formula:

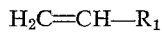

wherein R$_1$=hydrogen atom, straight or branched chain alkyl radicals with 1 to 29 carbon atoms, which are reacted with tri- to hexavalent alcohols, if necessary, together with mono- or dialcohols.

The selection of the comonomer mixture depends upon the particular use contemplated for component (a) as binders for coating compositions and is based upon the nature of the rigid or flexible surfaces to be coated, and must conform to the desired properties such as hardness and elasticity.

The difficulty saponifiable vinyl ester, as for example, vinylpivalate, imparts hardness to the copolymer, whereas difficultly saponifiable vinyl esters having more than 2 carbon atoms in the straight chain portion of the alkyl radical imparts flexibility to the copolymer. Methylmethacrylate, for example, is a monomer that imparts hardness to the copolymer.

Acrylic acid esters having two or more carbon atoms in the alcohol portion thereof, methacrylic and fumaric acid esters with four and more carbon atoms in the alcohol portion thereof, when used as comonomers, generally produce softness and flexibility in the copolymer if the alcohol portion in these monomers is not branched.

The copolymers serving as a basis for the present novel component (a) are prepared in known manner at raised temperatures, preferably in aromatic solvents, for example, in xylene or in a high-boiling mixture of aromatics. The reaction takes place in a temperature range between 50 and 250° C., preferably from 90 to 170° C., by a free radical-polymerization process. This process is carried out in the presence of catalysts yielding free radicals such as peroxides, as for example, benzoyl peroxide, di- tert.-butylperoxide or azo compounds. However, the reaction can also be carried out thermally at higher temperatures. When using low-boiling monomers, or monomers that are gaseous at room temperature, it is necessary to operate under pressure. In carrying out the process according to the present invention, it is generally preferred to effect the reaction with the polyols in a solvent that is the same as the solvent used for the polymerization of the monomers. In addition to the preferred aromatic solvents used, it is possible to operate in the presence of other solvents which do not participate, or only participate to a small extent, in the esterification reaction, as for example, aliphatic hydrocarbons, ketones, esters and tertiary alcohols.

The viscosities of the solutions of the starting polymers, measured in 60% solutions at 20° C. on the Gardner-Holdt scale, may lie within the whole range of this scale. Products having Gardner viscosities from A to D should be classified copolymers of low molecular weight, those having viscosities from E to Y copolymers of average molecular weight, and those with viscosities from Y to Z$_2$ copolymers of high molecular weight.

Since the reaction between the copolymers, in a solution of aromatics, and the polyols for the preparation of component (a) requires at higher temperatures relatively long periods, the content of free hydroxyl groups gives rise, possibly as side reactions, to reesterifications between these and the ester groups that are brought into the copolymer, for example, by the use of acrylic acid or methacrylic acid alkylesters, or fumaric acid dialkylesters. Methacrylic acid esters have less tendency to undergo reesterification than acrylic acid and fumaric acid esters. The extent of the reesterification also depends upon the nature of the alcohol that is combined in the monomers in the form of esters. Methanol is split off easier than ethanol, and so on. Ester groups with secondary or tertiary alcohols show only slight or no tendency toward reesterification. These reesterification reactions are of importance in the selection of the copolymer for the reaction with trivalent alcohols which results in the formation of component (a). The copolymers having molecular weights should not contain groups that are inclined to reesterify since this would produce, in the course of the triol reaction, a certain amount of gel formation before achieving compatibility with the melamine resins. The reesterifications must, therefore, be confined to limits above which it is not possible to avoid the formation of insoluble or gel-like reaction products due to cross-linking, before achieving compatibility with the melamine resins.

The alkylated aminoplasts used for the combination in accordance with the present invention are prepared by alkylation of a condensation product obtained from an aldehyde and urea, N,N'-ethyleneurea, dicyandiamide or aminotriazines, by means of an alkanol containing 1 to 6 carbon atoms. It is possible to use an alkylated aminoplast as the component (b) on condition that it is soluble in the organic solvent used for the preparation of the heathardenable coating composition. In general, the alkylated aminoplast should contain at least 80%, and preferably 100% methylol groups, which are alkylated with an alkanol having 1 to 6 carbon atoms. It is preferred to use alkylation products that were obtained with alkanols having 3 to 6 carbon atoms. The butylated products are particularly desirable because of their greater compatibility with a large number of polyol reaction products and solvents.

Aminotriazines suitable for the preparation of the aminoplasts that constitute the component (b) are: melamine, acetoguanamine, benzoguanamine, formoguanamine ammeline, 2-chloro-4,6-diamino-1,3,5-triazine, 2-phenyl-p-hydroxy-4,6-diamino-1,3,5-triazine, 6-methyl-2,4-diamino-1,3,5-triazine, 6-methyl-2,4-diamino-1,3,5-triazine, 2,4,6-trihydrazine-1,3,5-triazine, 2,4,6-triethyl-triamino-1,3,5-triazine or N,N-di-(C$_1$-C$_4$-alkylmelamine, such as N,N-dimethylmelamine. As the aldehyde, although most aldehydes are suitable, such as acetaldehyde, crotonaldehyde and acrolein, it is preferred to use condensation products prepared with reversible polymers of formaldehyde, such as paraformaldehyde. The component (a) and the component (b) are dissolved in the organic solvent in a ratio of 50 to 95 parts of the copolymer reacted with polyols to 50 to 5 parts of aminoplasts. The quantitative relations of component (a) and alkylated aminoplast must be chosen in such a way that the two components are compatible in the coating solution as well as in the finished film. It is possible to use any desired concentration of the component (a) and of the aminoplast in the solvent, for example, from 1 to 60% by weight. If a pigment is present, the total content of the solids in the coating composition should lie between 5 and 75% by weight. The ratio of pigment to binder, i.e., component (a) plus aminoplast can lie between 1:20 and 20:1.

As solvents it is possible to use: hydrocarbons, such as benzene, toluene, xylene and aromatic naphthenes or mixtures of such solvent; esters, such as ethyl, butyl, amyl, ethoxyethyl or methoxyethyl acetate, lactate or propionate; ketones, such as acetone, methylisopropylketone, methylisobutylketone, dioxane, isophoronehexanone or cyclohexanone; alcohols, such as n-butanol, t-butanol, isopropyl alcohol, n-propyl alcohol, amyl alcohol and cyclohexanol; ethers, such as diethylether, the monoethyl, monomethyl and monobutylether of ethylene glycol and various other solvents, such as dimethylformamide, dimethylacetamide, acetonitrile, nitromethane, nitroethane, nitropropane or nitrobutane, as well as mixtures of two or more solvents belonging to the same group as well as of several or all of the groups mentioned above.

As pigments, it is possible to incorporate: inorganic pigments, such as chrome yellow, Prussian blue, Brunswick green; titanium pigments, such as titanium dioxide, extended titanium pigments (which are extended either with precipitated or natural fillers, such as alkaline earth metal sulfates, as for example, calcium sulfate and barium sulfate); toned titanium pigments, titanates, such as barium, zinc, lead and magnesium titanate. Also other types of inorganic pigments can be used, for example, zinc sulfide pigments, such as zinc sulfide, lithopone, extended zinc sulfide pigments, such as lithopone with a calcium basis, zinc sulfide, zinc oxide or antimony oxide extended with natural fillers; or organic pigments, i.e., organic dyes that are free of sulphonic or carboxylic acid groups or other groups that impart water-solubility. The expression "pigment" also embraces other water-insoluble organic dyes, as for example, the calcium or barium lacquers of azo lacquer dyes.

The new heat-hardenable compositions can be applied to the substrate in any desired fashion, for example, by brushing, spraying, dipping or rolling on. They are then dried and hardened by heating. In general, it is not necessary to add curing catalysts. However, an acid catalyst can be added, if necessary. The amount of such a catalyst may lie between 0.1 and 1% by weight based upon the weight of the aminoplast. The use of a curing catalyst may be appropriate when it becomes necessary to apply low hardening temperatures.

When curing catalysts are used, it is possible to achieve insolubility simply by drying and aging at room temperature. The catalysts used for the hardening treatment to set up the compositions according to the present invention, can be any acid catalyst, including all organic and inorganic acid catalysts. For example, it is possible to use a catalytic amount of sulfuric or hydrochloric acid or the salts thereof, as for example, ammonium sulfate or ammonium chloride, or an organic acid, such as acetic acid, phthalic acid, benzoic acid, toluenesulfonic acid, naphthalene sulfonic acid or the monosalt of maleic acid with triethylamine.

The drying of the coatings can be effected at raised temperatures, for example, 60 to 104° C. The hardening can be carried out at 80 to 230° C., whether or not a catalyst is present. The hardening period may lie in the upper temperature range of about 230° C. between ½ and 2 minutes and in the lower temperature range of about 80° C. between 1 and 2 hours. However, it is particularly advantageous to effect the hardening for 15 to 30 minutes at 120 to 130° C.

The binders according to the present invention, in which the component (a) contains as the reaction product of polyols and soluble copolymers, a difficultly saponifiable vinyl ester having the above formula copolymerized therein, and is mixed with aminotriazine-formaldehyde resins, upon being pigmented with $TiO_2$, yielded films having a high gloss after baking at 120° C. for 30 minutes.

Weathering tests show that the binder combinations according to the present invention are superior, as to the durability of the gloss, to known binders that contain methacrylate esters and/or acrylic acid esters with or without styrene, but also contain hydroxyl and carboxyl groups copolymerized in the chain, and which are used as in the present case with aminotriazine-formaldehyde resins and $TiO_2$ in the form of mixtures. Moreover, they possess superior gloss durability than that of commercial alkyd resins having as a basis coconut fat or castor oil.

EXAMPLE 1

(A) Preparation of component (a) contained in the heat-hardenable coating composition.—620 parts by weight of Vinylversatic-Ester 911 (trademark of Shell) and 944 parts by weight of an aromatic solvent mixture having boiling ranges from 150 to 170° C. are introduced into a three-necked flask equipped with a stirrer, thermometer and reflux cooler, and heated to 130 to 140° C. A mixture consisting of 16 parts by weight of benzoyl peroxide, 335 parts by weight of methylmethacrylate, 106 parts by weight of maleic acid anhydride and 335 parts by weight of butylacrylate is then added within a period of 8 hours and polymerized for an additional 2 hours. The body content of the solution amounts to 56.0%. Upon adding another 3 grams of benzoyl peroxide and continuing the polymerization at 130 to 140° C., it is possible to arrive at a body content of 58% and a viscosity of I to J on the Gardner-Holdt scale. The resin solution is clear at room temperature. The resin is incompatible with melamine-formaldehyde resins, even after being baked (ratio 70:30).

1000 parts by weight of the 58% resin solution are mixed with 62 parts by weight of trimethylolpropane and heated under reflux at about 168 to 172° C. After a reaction period of 8 hours, the reaction product was found to be compatible with melamine-formaldehyde resins after being baked. The product is now diluted with isobutanol to a body content of 50%. The viscosity of the 50% solution was approximately that of D to E on the Gardner-Holdt scale, whereas the acid number was 45 and the hydroxyl number about 65.

(B) Preparation of the heat-hardenable coating composition totaling up to 70% of component (a) to 30% of melamine resin.—700 parts by weight of the component (a) prepared according to Example 1A in the form of a solution were mixed at room temperature with 300 parts by weight of an isobutanol-etherified melamine-formaldehyde resin prepared in accordance with German Pat. 1,127,083.

The melamine resin was prepared by the process described in Example 1 of German Pat. 1,127,083 in such a way that, after the separation of water, it had a viscosity of A–B on the Gardner-Holdt scale, the excess isobutanol being then distilled off and replaced with xylene. The solution had a solids content of 50 to 52% by weight and a viscosity of 50 to 70 DIN-seconds at 20° C.

This mixture and 340 grams of $TiO_2$ (rutile) was made into a lacquer by grinding which was diluted with butylacetate to a spraying viscosity of 20 DIN-seconds. It was applied to phosphated sheet metal and baked for 30 minutes at 130° C. The films had an excellent gloss, even after weathering.

EXAMPLE 2

(A) Preparation of component (a) contained in the coating composition.—310 parts by weight of Vinylversatic-Ester 911 (trademark of Shell) and 944 parts by weight of a mixture of aromatic solvents having boiling range of 150 to 170° C., are heated to 130 to 140° C., whereupon a mixture consisting of 16 parts by weight of benzoyl peroxide, 490 parts by weight of methylmethacrylate, 106 parts by weight of maleic acid anhydride and 490 parts by weight of butylacrylate is added within a period of 8 hours and polymerized for an additional 2 hours. The body content of the solution amounts to 58%. Upon adding another 4 grams of benzoyl peroxide and continuing the polymerization at 130 to 140° C. it is possible to arrive at a body content of 59% and a viscosity of O to P on the Gardner-Holdt scale. The resin solution is clear at room temperature. The resin is incompatible with melamine-formaldehyde resins, even after being baked (ratio 70:30).

100 parts by weight of the 59% resin solution are mixed with 62 parts by weight of trimethylol-propane and are heated under reflux to about 168 to 172° C. After a reaction period of 8 hours, the reaction product was found to be compatible with melamine-formaldehyde resins after being baked. The product is now diluted with isobutanol to a body content of 50%. The viscosity of the 50% solution was approximately that of J on the Gardner-Holdt scale, where as the acid number was 40 and the hydroxyl number about 75.

(B) Preparation of the coating composition totaling up to 70% of component (a) to 30% of melamine resins.—700 grams of component (a) prepared according to Example 2A in the form of a solution are mixed with 300 grams of the melamine resin used in Example 1B in the form of a 50% solution and applied to deep-drawn sheet metals and baked thereon for 30 minutes at 130° C. The films obtained in this manner had an excellent surface hardness, a fine gloss and a good stability with respect to xylene.

The vinylversatic acid 911 ester used in the copolymerization has been described in the literature. More particularly, the copolymerization of these vinyl esters with vinyl acetate is described in Congress Fatipec, vol. VII, pages 49–60 (Verlag Chemie G.m.b.H, Weinheim, Bergstrasse) in an article by P. Bruin et al. entitled, "Latices Based on Copolymers of Vinyl Esters of Branched Carboxylic Acids and Vinyl Acetate." The vinylversatic acid 911 ester is essentially a vinyl ester of a branched chain synthetic $C_{9-11}$-monocarboxylic acid. This acid is prepared by a process developed by the Koninklijke Shell Labroatorium, Amsterdam, from a mixture of $C_8$-, $C_9$- and $C_{10}$ olefines with carbon monoxide and water.

The reaction is based upon the pioneer work of Dr. H. Koch (Brenstoff-Chemie 36 [1955], 321 and Fette, Seifen, Anstrichmittel 39 [1957], 494). The $C_9$—, $C_{10}$— and $C_{11}$— monocarboxylic acids are completely saturated and highly substituted at the carbon atom in alpha position. Acids having two hydrogen atoms are not present and only 6 to 7% of these acids contain a hydrogen atom. There was also evidence of cyclic material.

The commercial product vinylversatic acid 911 ester has the following characteristics:

Color (Hazen)—15
Average molecular weight—197
Specific weight—0.885–0.890
Viscosity at 20° C.—2.2 cs. St.
Vapor pressure at 30° C.—1 mm. Hg
Vapor pressure at 110° C.—29 mm. Hg
Flash point (PM geschl. T.)—82° C.
Refractive index $n$ 20/D—1.439
Solubility in water at 20–80° C.—50 p.p.m.
Solubility of water in ester at 22° C.—0.09% by weight
Solubility of water in ester at 60° C.—0.12% by weight
Acid number—1
Bromine number—78–80
Latent heat of vaporization—12.1 Kcal./mole
Heat of polymerization—23 Kcal./mole
Boiling range at 100 mm. Hg—129–180° C.

What is claimed is:
1. A binder suitable for forming heat hardenable coating compositions soluble in organic solvents comprising a blend of (A) about 50–90% by weight of a soluble reaction product prepared by reacting (1) a copolymer prepared by heating (a) from 1 to about 25 mole percent of alpha-beta unsaturated dicarboxylic acid anhydride and (b) at least one monomer of the group consisting of vinyl esters having the formula

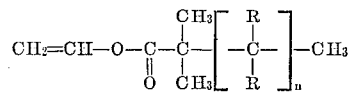

wherein R is hydrogen, $CH_3$, $C_2H_5$, $C_3H_7$, $C_4H_9$, $C_6H_5$, and $n$ an integer from 0–6, and (c) at least one monomer selected from the group consisting of alkylmethacrylate, alkyl acrylate, dialkyl fumarate wherein the alkyl radicals have from 1–10 carbon atoms and alpha-olefines of the formula $H_2C=CHR_1$ wherein $R_1$ is hydrogen and an alkyl chain of 1–20 carbon atoms with (2) an alcohol having at least 3 hydroxy groups present, until an acid number of about 5 to about 60 and a hydroxyl value of about 20 to about 120 is obtained and (B) about 50% to about 5% by weight of an aminoplast selected from the group consisting of urea-formaldehyde and aminotriazine formaldehyde resins, etherified with an alcohol.

2. A binder according to claim 1 wherein (2) is trihydric alcohol.

3. A binder according to claim 1 wherein (c) includes at least one member of the group consisting of alkylmethacrylate, in which alkyl has from 1–10 carbon atoms and alpha-olefine of the formula $H_2C=CHR_1$, wherein $R_1$ is hydrogen and an alkyl of 1–20 carbon atoms.

4. A binder as set forth in claim 1 wherein component (A) has an acid number of 20–50.

5. A binder as set forth in claim 1 wherein component (A) has a hydroxyl number of 30–90.

6. A binder according to claim 1 wherein component (A) includes a copolymer which contains as ingredient (a) up to 20% by weight of maleic acid anhydride.

7. A binder according to claim 6 wherein ingredient (a) comprises 5–10% by weight of maleic acid anhydride.

8. A binder according to claim 1 wherein component (A) includes a copolymer which contains as ingredient (a) up to 3% by weight of itaconic acid anhydride.

9. A binder according to claim 8 wherein ingredient (a) comprises 6–12% by weight of itaconic acid anhydride.

10. A binder according to claim 1 wherein (A) is a reaction product of a trihydric alcohol and a copolymer, wherein per mole of anhydride group in said copolymer 0.8–1.8 mols of trihydric alcohols were reacted.

11. A binder according to claim 10 wherein .8 to 1.2 moles of the trihydric alcohol is reacted per mole of anhydride in the copolymer.

12. A binder according to claim 1 wherein component (A) includes a reaction product of at least one trihydric alcohol selected from a group consisting of trimethylolpropane, trimethylolethane and hexanetriol-1,2,6 or mixtures thereof, with the copolymer.

13. A binder according to claim 1 wherein component (A) consists of copolymers reacted with trihydric alcohols, said copolymers being the copolymerization product of 5 to 10% by weight of maleic acid anhydride, 20 to 50% by weight of vinyl esters having the following formula:

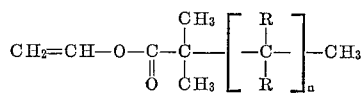

wherein R=hydrogen atom, —methyl, —$C_2H_5$, —$C_3H_7$, —$C_4H_9$ or —$C_6H_5$ radicals and $n=0, 1, 2, 3$ to 6, and 20 to 75% by weight of at least one member of a group consisting of acrylic acid and fumaric acid esters and mixtures thereof, having alkyl radicals containing 1 to 10 carbon atoms, and 0 to 30% by weight of methylmethacrylate.

14. A binder according to claim 1 wherein component (A) consists of a copolymer reacted with a tryhydric alcohol, said copolymer being the copolymerization product of 5 to 10% by weight of maleic acid and hydride 20 to 70% by weight of a difficultly saponifiable vinyl ester having the following formula:

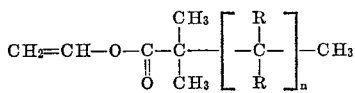

wherein R=hydrogen atom, —methyl, —$C_2H_5$, —$C_3H_7$, —$C_4H_9$, or —$C_6H_5$ radicals and $n=0, 1, 2, 3$ to 6, and 5 to 30% by weight of at least one mono-olefine having the formula $H_2C=CH-R_1$, wherein $R_1$=hydrogen atom, straight or branched chain alkyl radicals having 1 to 20 carbon atoms.

15. A binder according to claim 1 wherein component (B) contains a butylated melamineformaldehyde resin.

References Cited

UNITED STATES PATENTS

| | | | |
|---|---|---|---|
| 2,418,688 | 4/1947 | Atwood. | |
| 2,725,308 | 11/1955 | Nickerson | 260—851 |
| 2,912,413 | 11/1959 | Baer. | |
| 3,085,986 | 4/1963 | Muskat. | |
| 3,118,848 | 1/1964 | Lombardi et al. | 260—851 |
| 3,196,120 | 7/1965 | McLaughlin et al. | 260—855 |
| 3,267,174 | 8/1966 | Fry et al. | 260—851 |
| 3,294,727 | 12/1966 | Grommers et al. | 260—29.6 |
| 3,352,806 | 11/1967 | Hicks | 260—851 |

JOHN C. BLEUTGE, Primary Examiner

U.S. Cl. X.R.

117—132, 161; 260—31.2, 31.4, 32.4, 32.6, 32.8, 33.2, 33.4, 33.6, 39, 41, 75, 78.5, 850, 851, 856